United States Patent Office 3,591,548
Patented July 6, 1971

3,591,548
STABILIZED INTERCONNECTED SBR COPOLYMER
Joseph A. Beckman, Kenneth C. Eberly, and Edward L. Kay, Akron, Ohio, assignors to The Firestone Tire & Rubber Company, Akron, Ohio
No Drawing. Filed June 16, 1969, Ser. No. 833,686
Int. Cl. C08c 11/04, 11/22
U.S. Cl. 260—33.6AQ         5 Claims

ABSTRACT OF THE DISCLOSURE

An unvulcanized, interconnected (linear rubbery polymer) is stabilized by means of a borate of a metal such as magnesium, zinc or lead. In the resulting polymer, butadiene-styrene copolymer units are interconnected by silicon tetrachloride.

---

This invention relates to stabilizers for rubbery stereoregular homopolymers of conjugated diolefins of 4 and 5 carbon atoms and copolymers thereof with olefins, and more particularly the rubbery copolymer of butadiene and styrene, and especially the unvulcanized, oil-diluted interconnected (or jumped) polymers.

The term "polymer" is used herein to include homopolymers and copolymers.

The stabilizers of this invention are metal borates, and more particularly magnesium orthoborate, magnesium metaborate, lead metaborate and zinc borate.

From 0.005 to 5 phr. (parts per hundred parts of the polymer), and generally from about 0.1 to 2 phr. will be used. Less may be used when the stabilizer of the invention is mixed with other stabilizer.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching of the polymer. One type of such reaction is exemplified by the reaction of silicon tetrachloride with a live polybutadiene produced by polymerization of butadiene in a non-aqueous system by means of a lithium-based catalyst (e.g., butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., Rubber Age, December 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethyl-aluminum sesquichloride and water.

Another type of molecular-weight-increasing-reaction, or interconnecting (jumping) reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically, exemplified by a mixture of polymers having a molecular weight distribution including the original molecular weight of the unreacted rubbery polymer to molecular weights of dimers, trimers, tetramers, and higher polymers of the original rubbery polymer. All of these polymers of increased molecular weight contemplated by the invention have improved ability to accept diluting oil and possess good milling and extruding properties ("processing" properties) when extended with oil. From 10 to 100 parts of processing oil, or thereabout may be added to 100 parts of the polymer.

Difficulty has been experienced in stabilizing many oil-diluted rubbery polymers. The stabilizer of this invention provides excellent stabilization of unvulcanized oil-diluted interconnected rubbery polymers, i.e. an unvulcanized linear rubbery polymer which has been interconnected and oil diluted. The invention finds widest use in the stabilization of such copolymers of butadiene and styrene but is useful with other interconnected rubbery polymers, and particularly those derived from the polybutadienes, polyisoprenes and butadiene-isoprene copolymers of any stereo composition. Polymers suitable for use in the interconnecting reaction can be conveniently made by the methods of U.S. Pat. No. 3,317,918, for example.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of polymer, although the amount of oil can vary from 10 to 100 parts, more or less. The oil preferably is added to the polymer after the polymerization and interconnecting reactions are completed. The stabilizer can be added prior to the addition of the oil, it can be added with the oil, or it can be added soon thereafter.

The stabilizer is incorporated into the polymer in the usual mannner. The stabilizing effect is recognized by the lessening of the decrease in the viscosity of the polymer on heat aging. The stabilizers are added to protect the polymer during storage and processing. The vulcanizates are useful wherever rubber vulcanizates have been employed, as in the manufacture of tires, hose, and a wide variety of products.

The polymer used in the tests recorded in the following table was prepared by reaction of $SiCl_4$ with live butadiene-styrene copolymer obtained through continuous non-aqueous polymerization utilizing butyllithium as a catalyst. A polymer cement-oil masterbatch was prepared containing 37.5 parts of processing oil per 100 parts of polymer, and the stabilizers of this invention were added to portions of the masterbatch to produce the samples for aging studies.

These masterbatch samples were desolventized on a drum drier. Each dried polymer masterbatch sample was milled to achieve homogeneity and samples of the appropriate size were cut from each of the milled polymers. A Mooney viscosity (ml./4/212° F.) determination was made on each sample prior to aging. Samples containing the various stabilizers were then aged in a forced air oven at 75° C. for various periods of time. The results obtained with the different stabilizers of this invention are recorded in the following table.

TABLE

| Stabilizer | Percent retention of Mooney viscosity (ml./4/212° F. after aging) | | | |
|---|---|---|---|---|
| | 2 days | 4 days | 6 days | 8 days |
| Control | 96.0 | 96.0 | 93.5 | 102.5 |
| No stabilizer | 88.5 | 83.0 | 79.0 | 75.0 |
| 0.5 phr. magnesium orthoborate | 86.5 | 84.5 | 86.5 | 93.5 |
| 0.5 phr. magnesium metaborate | 92.5 | 87.0 | 89.5 | 85.0 |
| 0.5 phr. lead metaborate | 92.0 | 96.0 | 96.5 | 100.0 |
| 0.5 phr. zinc borate | 96.0 | 92.0 | 90.0 | 96.0 |
| 0.5 phr. calcium metaborate | 89.0 | 82.0 | 78.0 | 75.5 |
| 0.5 phr. barium metaborate | 86.5 | 77.5 | 79.5 | 75.0 |
| 0.5 phr. nickel borate | 84.5 | 79.0 | 77.0 | 75.0 |

In the foregoing table, a sample containing no stabilizer is included as well as a sample containing a commercial stabilizer and identified as "Control." The barium, calcium and nickel borates showed substantially no stabilizing effect, the decrease in viscosity being substantially the same as with the sample containing no borate. They are not included as stabilizers. The magnesium orthoborate, magnesium metaborate, lead metaborate and zinc borate show beneficial stabilizing effects. They are much less costly than the commercial stabilizer system.

The stabilized oil-diluted polymers of the invention are useful in practically every instance in which conventional oil-diluted SBR, oil-diluted natural rubber and oil-diluted rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g., natural rubber, polybutadienes, polyisoprenes, butadiene-styrene copolymer, isoprene-isobutylene copolymer, polychlorprene, isoprene-styrene copolymer) with or without additional oils, for forming vulcanizates of great technical importance. The novel stabilized polymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commercial synthetic rubbers are useful for forming vulcanizable stocks containing the novel stabilized polymer. Known methods of mixing, forming, fabricating and curing or vulcanizing compositions of natural and commercial synthetic rubbers are applicable to and useful with compositions containing the novel stabilized polymers of the invention. The novel polymers are especially useful in pneumatic tire tread, sidewall and carcass compositions, and the considerations of this paragraph are especially relevant to the use of the novel polymers in tires.

We claim:

1. Rubbery copolymer of butadiene and styrene copolymer units, interconnected by silicon tetrachloride, extended with 10 to 100 parts of processing oil per 100 parts of interconnected polymer, unvulcanized, and stabilized with 0.005 to 5 parts of a borate per 100 parts of the copolymer, the borate being selected from the class consisting of magnesium orthoborate, magnesium metaborate, lead metaborate and zinc borate.

2. The composition of claim 1 in which the stabilizer is magnesium orthoborate.

3. The composition of claim 1 in which the stabilizer is magnesium metaborate.

4. The composition of claim 1 in which the stabilizer is lead metaborate.

5. The composition of claim 1 in which the stabilizer is zinc borate.

References Cited

UNITED STATES PATENTS

| 2,935,485 | 5/1960 | Reynolds | 260—23.7 |
| 3,281,383 | 10/1966 | Zelinski et al. | 260—23.7 |

DONALD E. CZAJA, Primary Examiner

V. P. HOKE, Assistant Examiner

U.S. Cl. X.R.

260—23.7M, 23.7R, 45.7R, 45.75R